P. G. GARDINER.
Testing and Measuring Steel Springs.
No. 19,767.  Patented March 30, 1858.
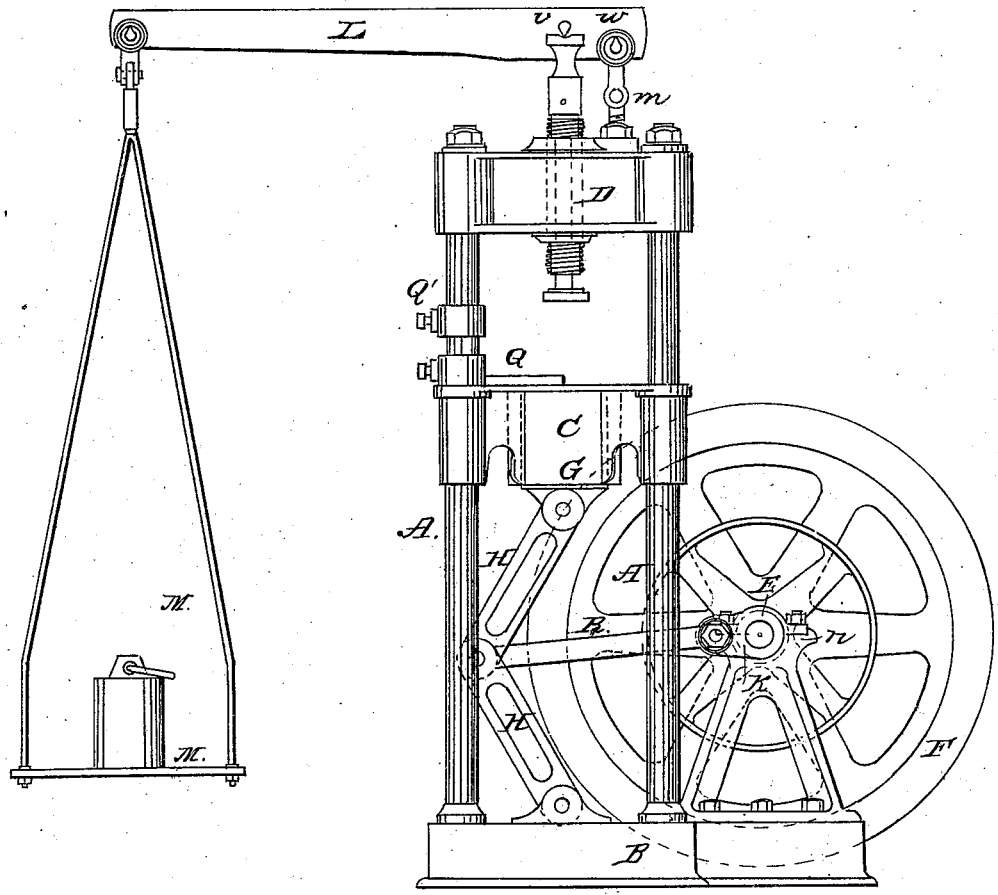
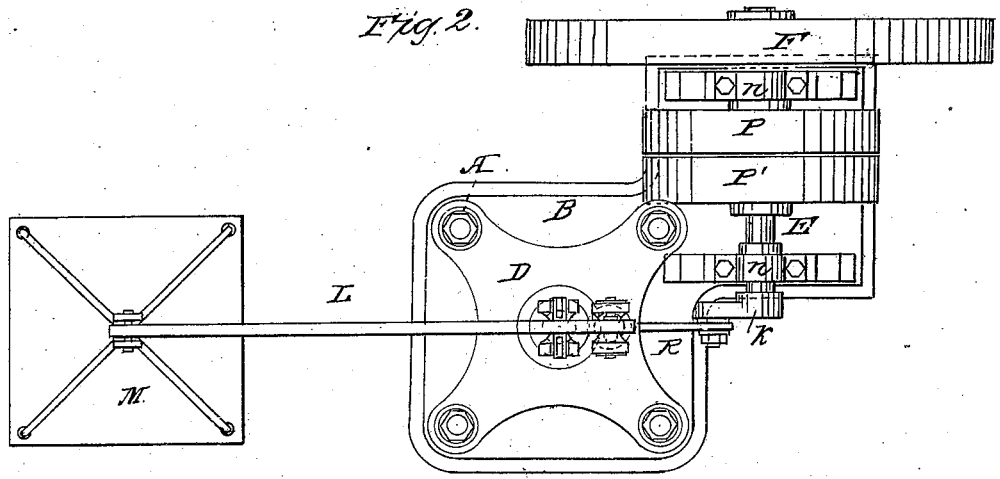

UNITED STATES PATENT OFFICE.

PERRY G. GARDINER, OF NEW YORK, N. Y.

MACHINE FOR TESTING AND MEASURING THE STRENGTH OF CAR-SPRINGS.

Specification of Letters Patent No. 19,767, dated March 30, 1858.

*To all whom it may concern:*

Be it known that I, PERRY G. GARDINER, of the city, county, and State of New York, mechanical engineer, have invented a new and useful improvement in machinery for testing and measuring the power of the improved railroad conical coiled car-springs after the same have been tempered and hardened as manufactured by me by my machinery, and that the following is a full and exact description of my said improved machine, reference being had to the accompanying drawings, making part of this my specification.

Figure I, represents an elevation of the machine. Fig. II, represents a top view or plan.

A, A, A, A, are four upright columns secured into the bed plate B having upon them near the middle the bracket platform C which is capable of being moved upon the column and is held fast by set screws; the tops of the columns A are braced fast together by the cross framing D.

E is a driving shaft running in suitable bearings n, n, attached to the bed plate B, and provided with fast and loose pulley P, P' and a fly wheel F.

G is a solid plunger and cylinder and traverses up and down vertically through the circular guide C in the center of the bracket plate, into which it is accurately fitted; and it is connected at the under side with the toggle joint H, H, which is acted upon by the rod R which is connected at one end with the toggle joint and at the other with a wrist upon the end of the crank K fast upon the end of the driving shaft E by which motion is communicated to the plunger.

L is a balance beam constructed in the usual manner and acting upon knife edges v and w. The standard upon which the knife edge pivot w is supported is adjustable up or down by means of screw m. Upon the end of the scale beam is suspended a scale platform M to receive the weights. The knife edge pivot v, is supported upon the top of the upright spindle N passing through the center of a hollow screw shaft P screwed into the cross framing D and by which screw P the distance between the under surface of the spindle N and the top of the plunger G can be adjusted to the height or size of the spring which is to be tested.

Q is a plate which extends across the upper surface of the bracket E as far as the center of the plunger, but is cut into a semicircular form to correspond with the plunger and allow it to pass freeely. This plate Q acts as a guide plate for placing the spring in the right position directly over the center of the plunger. This plate Q is fastened to the columns by a screw as seen at Q'.

In testing and measuring the spring by the machine, the distance between the plunger G (when the plunger is at its highest pont) and the under surface of the spindle N is adjusted to the size of the spring by screwing the screw P farther in or out, and then adjusting the balance beam L to a horizontal position by adjusting the height of the knife edge pivot (w) by the screw (m) and then the required weight necessary to test and measure the power of the spring is placed upon the scale platform M. The spring is then placed with its bar resting upon the center of the plunger G, and the machine being put in motion, the upward motion of the plunger brings the top of the spring against the under surface of spindle N, when it will be ascertained whether the spring will bear the required pressure, and its power accurately measured if it stands the test.

What I claim as my invention in the foregoing and for which I desire Letters Patent, is—

The combination and arrangement of the plunger G with the adjustable spindle N and adjustable knife edge pivot w, and the guide plate Q, arranged and operating in connection with balance beam L, so as to test the power of the spring and at the same time measure with great facility and rapidity the exact weight or pressure to which the spring has been subjected, the whole being adjustable to any required size or power of spring.

P. G. GARDINER.

Witnesses:
J. B. STAPLES,
RICHARD WINNE.